US011783550B2

(12) United States Patent
Casaburo et al.

(10) Patent No.: US 11,783,550 B2
(45) Date of Patent: Oct. 10, 2023

(54) IMAGE COMPOSITION FOR EXTENDED REALITY SYSTEMS

(71) Applicant: Apple Inc., Cupertino, CA (US)

(72) Inventors: Daniele Casaburo, San Jose, CA (US); Adrian P. Lindberg, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/187,736

(22) Filed: Feb. 26, 2021

(65) Prior Publication Data

US 2022/0084289 A1 Mar. 17, 2022

Related U.S. Application Data

(60) Provisional application No. 63/079,977, filed on Sep. 17, 2020.

(51) Int. Cl.
*G06T 19/00* (2011.01)
*G06T 7/13* (2017.01)
*G06T 7/50* (2017.01)

(52) U.S. Cl.
CPC .............. *G06T 19/006* (2013.01); *G06T 7/13* (2017.01); *G06T 7/50* (2017.01)

(58) Field of Classification Search
None
See application file for complete search history.

(56) References Cited

U.S. PATENT DOCUMENTS

| 8,022,967 | B2 | 9/2011 | Okuno et al. |
| 9,269,003 | B2 | 2/2016 | Schmalstieg |
| 10,186,087 | B2 | 1/2019 | Davis et al. |
| 2019/0057513 | A1* | 2/2019 | Jain ........................... G06T 7/13 |
| 2020/0081530 | A1 | 3/2020 | Greenberg |
| 2021/0142497 | A1* | 5/2021 | Pugh ......................... G06T 7/90 |

* cited by examiner

*Primary Examiner* — Edward Martello
(74) *Attorney, Agent, or Firm* — BAKERHOSTETLER

(57) ABSTRACT

Implementations of the subject technology provide for image composition for extended reality systems. Image composition may include combining virtual content from virtual images with physical content from images captured by one or more cameras. The virtual content and the physical content can be combined to form a composite image using depth information for the virtual content and the physical content. An adjustment mask may be generated to indicate edges or boundaries between virtual and physical content at which artifact correction for the composite image can be performed.

28 Claims, 10 Drawing Sheets

— 1 —

IMAGE COMPOSITION FOR EXTENDED REALITY SYSTEMS

CROSS REFERENCE TO RELATED APPLICATIONS

This application claims the benefit of priority to U.S. Provisional Patent Application No. 63/079,977, entitled "Image Composition For Computer-Generated Reality Systems," filed on Sep. 17, 2020, the disclosure of which is hereby incorporated herein in its entirety.

TECHNICAL FIELD

The present description relates generally to extended reality environments.

BACKGROUND

Augmented reality technology aims to bridge a gap between virtual environments and a physical environment by providing an enhanced physical environment that is augmented with electronic information. As a result, the electronic information appears to be part of the physical environment as perceived by a user while the user views the physical environment via the augmented reality technology. However, it can be challenging to generate composite images that include physical objects and virtual objects.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
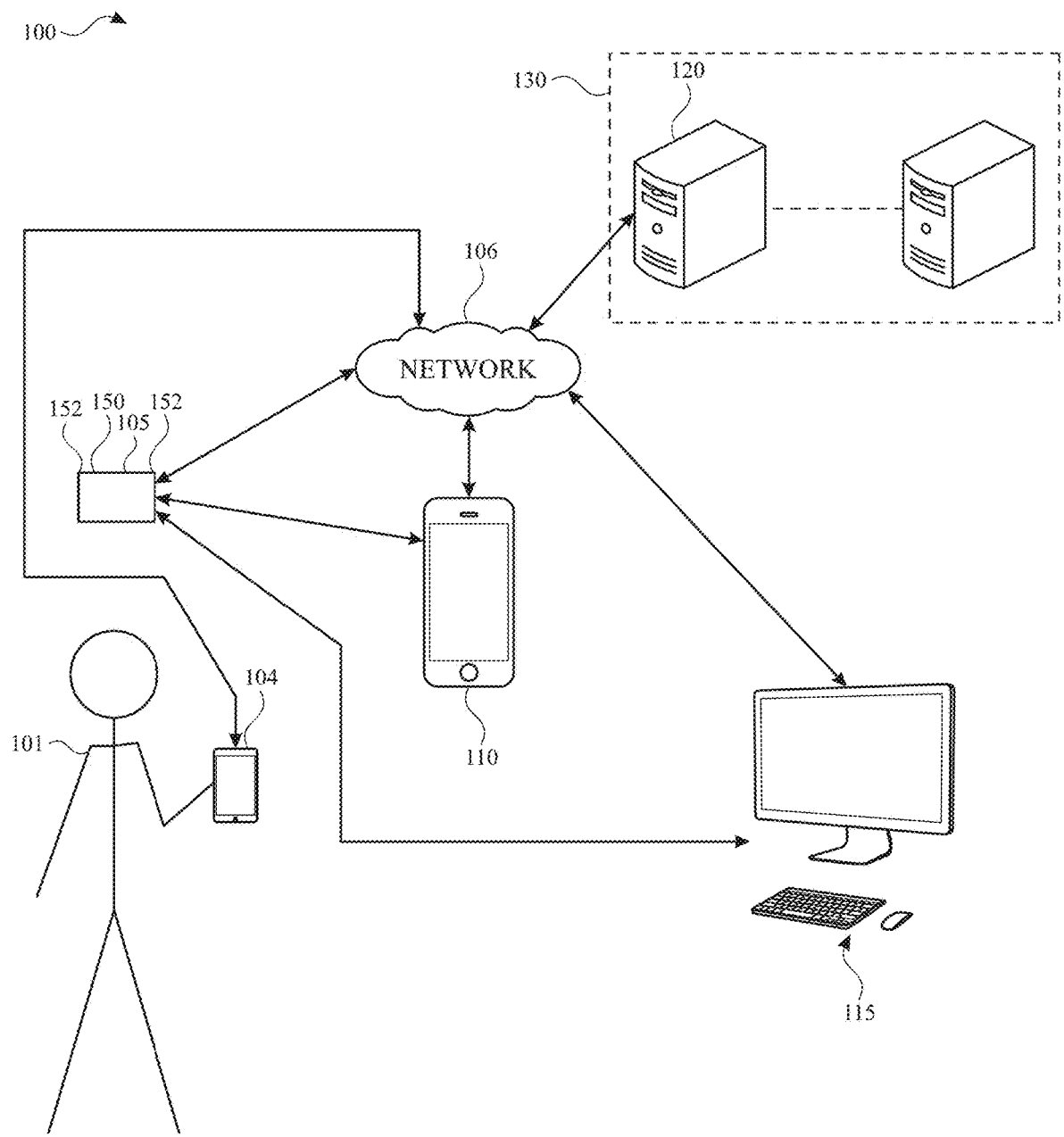
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide for the generation of composite images that include partially overlapping physical objects and virtual objects. In order to generate the composite images in a way that prevents inclusion of artifacts caused by edges of the overlapping objects, an adjustment mask is generated, in addition to an occlusion mask. The occlusion mask indicates where the physical and virtual object(s) overlap, and which is in the foreground of the other. A composite image can be generated using image information from the image of the physical object and a virtual image of the virtual object, using the occlusion mask. The adjustment mask indicates regions in which an additional correction is to be applied to remove and/or correct artifacts generated from the use of the occlusion mask.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices, and any number of servers or a data center including multiple servers.

The electronic device 105 may be a smartphone, a tablet, or a head mountable portable system (e.g., a head mountable display device that can be worn by a user 101), that includes a display system capable of presenting a visualization of an extended reality environment to the user. The electronic device 105 may be powered with a battery and/or another power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User input detected by such sensors and/or hardware elements correspond to various input modalities for initiating generating supplemental virtual content within a given extended reality environment. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect a presence of a person or object and/or an occurrence of an event in a scene to initiate providing supplemental virtual content within the extended reality environment.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the generated extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The network 106 may communicatively (directly or indirectly) couple, for example, the electronic device 105, the electronic device 110, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 10. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 10.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
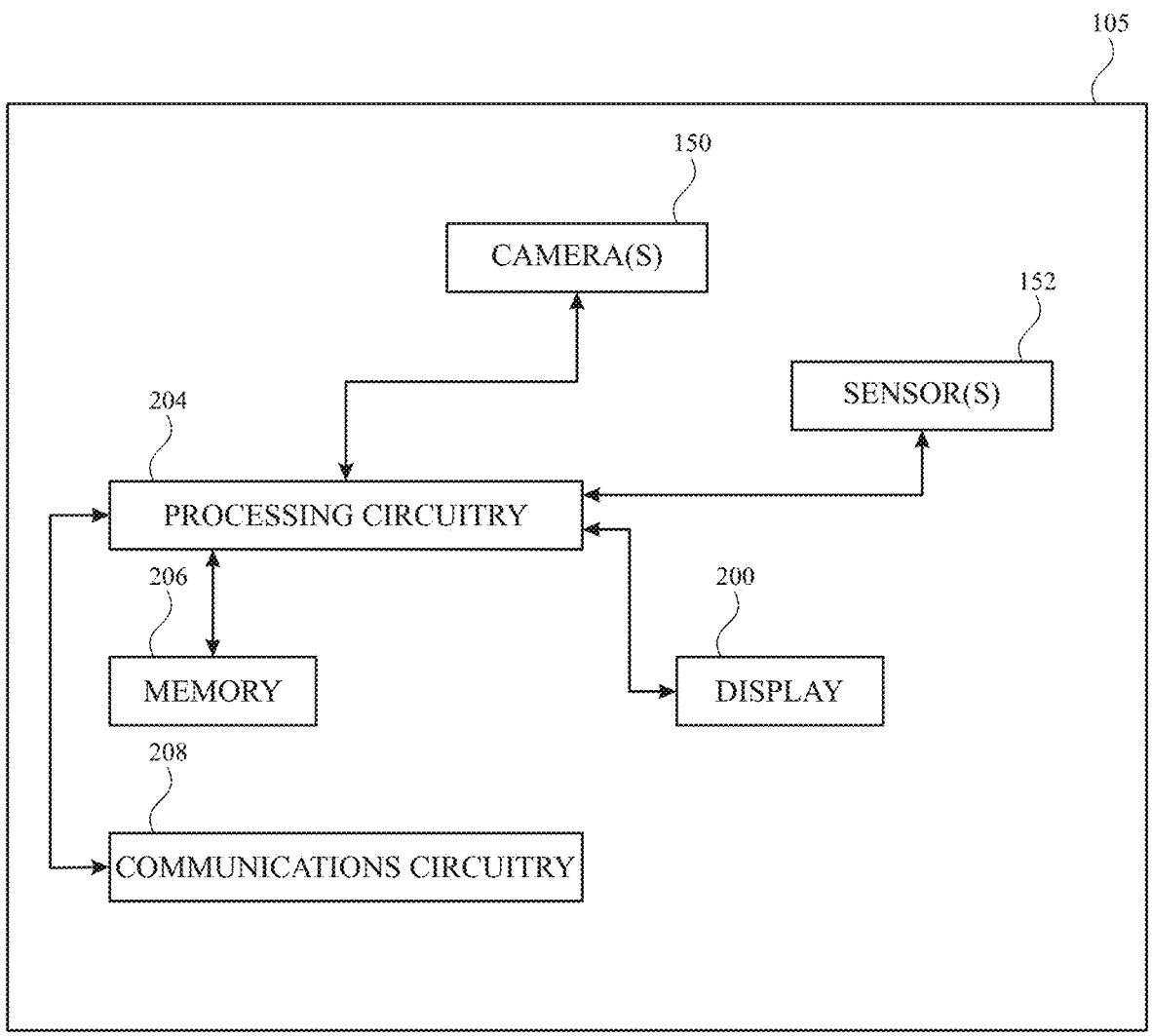
FIG. 2 illustrates a block diagram of example features of an electronic device, in accordance with one or more implementations.

FIG. 2 illustrates a block diagram of various components that may be included in electronic device 105, in accordance with aspects of the disclosure. As shown in FIG. 2, electronic device 105 may include one or more cameras such as camera(s) 150 that capture images of the physical environment (also referred to herein as physical environment images) around the electronic device, one or more sensors 152 that obtain environment information (e.g., physical depth information such as in physical depth images) associated with the physical environment around the electronic device 105. Sensors 152 may include depth sensors (e.g., time-of-flight sensors, infrared sensors, radar, sonar, lidar, etc.), one or more microphones, and/or other types of sensors for sensing the physical environment. Electronic device 105 also includes communications circuitry 208 for communication with electronic device 110, electronic device 115, servers 120, and/or other devices and/or systems in some implementations. Communications circuitry 208 may include radio frequency (RF) communications circuitry for detecting radio frequency identification (RFID) tags, Bluetooth Low Energy (BLE) communications circuitry, other near-field communications (NFC) circuitry, WiFi communications circuitry, cellular communications circuitry, and/or other wired and/or wireless communications circuitry.

As shown, electronic device 105 includes processing circuitry 204 (e.g., one or more processors and/or integrated circuits) and memory 206. Memory 206 may store instructions or code for execution by processing circuitry 204. Memory 206 may store (e.g., temporarily or permanently) content generated by and/or otherwise obtained by electronic device 105. In some operational scenarios, memory 206 may temporarily store images (e.g., physical environment images and/or physical environment image frames) of a physical environment captured by camera(s) 150, physical depth information corresponding to the images such as in physical depth images (e.g., physical depth image frames) generated, for example, using a depth sensor of sensors 152 and/or using multiple cameras or using camera images combined with motion or IMU information, virtual objects such as virtual objects in virtual images (e.g., virtual image frames) generated by processing circuitry 204 to include virtual content, and/or virtual depth information for the virtual objects such as virtual depth information in virtual depth images (e.g., virtual depth image frames) generated by processing circuitry 204 that indicate the depth of each pixel in the virtual images and/or each of various portions of a virtual object. Memory 206 may store (e.g., temporarily or permanently) intermediate images, information, and/or masks (e.g., occlusion masks, edge masks, and/or adjustment masks as described herein) generated by processing circuitry 204 for combining the image(s) of the physical environment and the virtual objects and/or virtual image(s) to form composite images for display by display 200.

Figure 3:
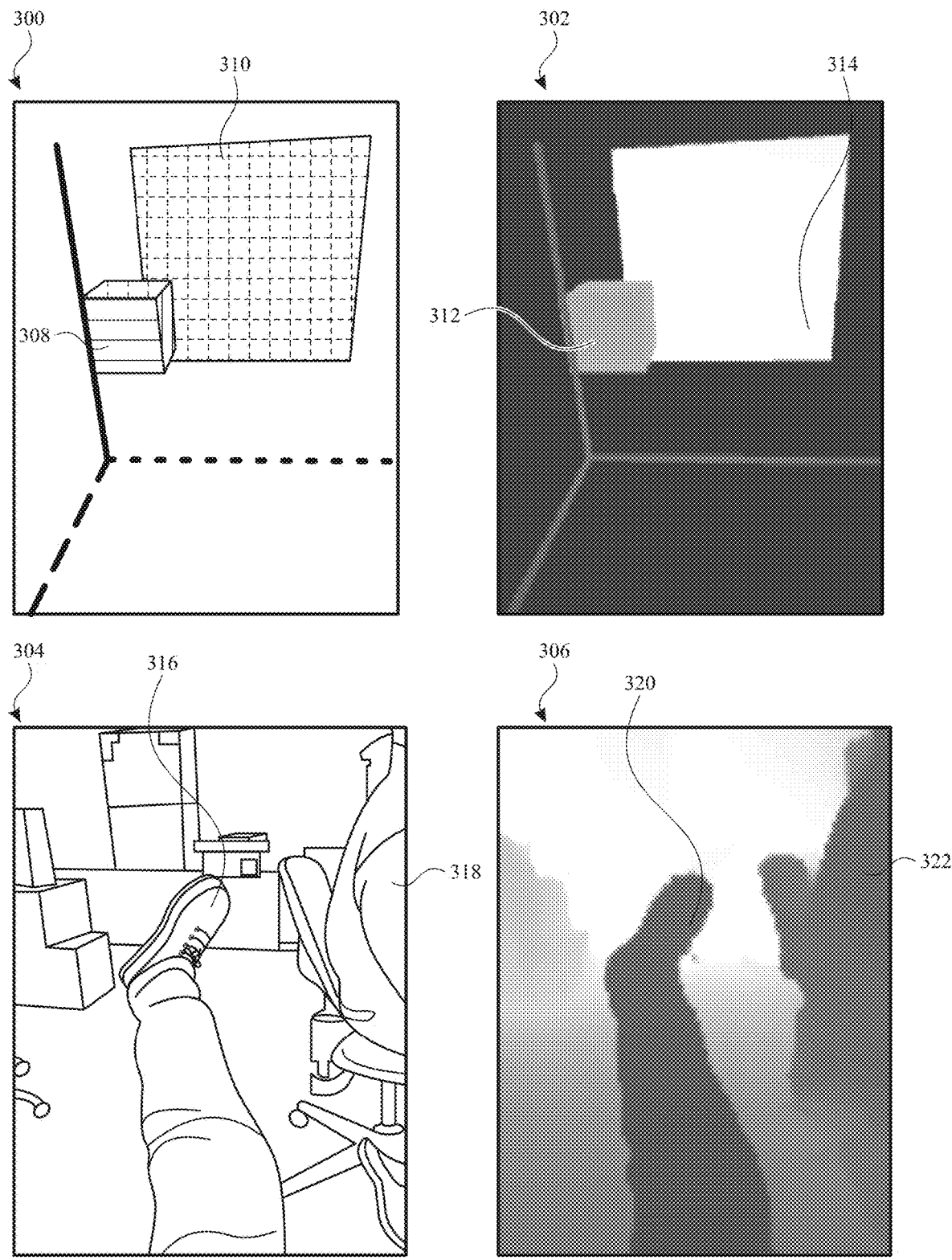
FIG. 3 illustrates examples of a virtual image, a virtual depth image, an image of a physical environment, and a physical depth image, in accordance with one or more implementations.

FIG. 3 illustrates examples of a virtual image 300, a virtual depth image 302, an image 304 of a physical environment, and a physical depth image 306. As illustrated by FIG. 3, a virtual image 300, which may be generated by an XR application using processing circuitry 204, may include on or more virtual objects such as virtual object 308 and virtual object 310. Virtual objects 308 and 310 may be stored in a virtual image as in the example of FIG. 3 or can be stored in other forms (e.g., without generating a virtual image of the virtual objects). Virtual depth image 302 may also be generated by processing circuitry 204 (e.g., by the XR application) with depth pixels each indicating the depth of a corresponding pixel in the virtual image 300. For example, virtual object 308 may have a corresponding depth indicated by the values of depth pixels 312 to be less than a corresponding depth of virtual object 314 as indicated by the values of depth pixels 314. The virtual depth information for virtual objects 308 and 310 can be stored in a virtual depth image as in the example of FIG. 3, or can be stored in other forms (e.g., without generating a virtual depth image). The virtual depth image 302 and/or the virtual depth information therein may also indicate the varying depths of different portions of a three-dimensional (3D) virtual object. In the example of FIG. 3, virtual object 308 appears closer to the viewer than virtual object 310, and partially overlaps virtual object 310. Virtual objects 308 and 310 may be generated for display within a physical environment scene including a portion of a physical environment of an electronic device such as electronic device 105.

Image 304 may be captured by one or more cameras such as camera(s) 150 of an electronic device such as electronic device 105, and may include images of one or more physical objects such as physical object 316 and physical object 318 in the physical environment of the electronic device. In the example of FIG. 3, physical object 316 is a leg and foot of a user of the electronic device 105, and the physical object 318 is a portion of the back of another person in the physical environment. The physical depth image 306 includes depth pixels that each indicates the depth of a corresponding pixel in the image 304. The values of the depth pixels in physical depth image 306 may include depth pixels 320 indicating the depth of various portions of physical object 316 and depth pixels 322 indicating the depth of various portions of physical object 318. Although the depth information corresponding to the portion of the physical environment captured in image 304 is stored in the form of a physical depth image 306 in the example of FIG. 3, the depth information (e.g., depth information corresponding to physical object 316 and/or physical object 318) may be stored in other forms (e.g., without generating a physical depth image).

An electronic device such as electronic device 105 may combine the image 304 and the virtual object(s) (e.g., using the virtual image 300), using the physical depth information (e.g., in the physical depth image 306) and the virtual depth information (e.g., in the virtual depth image 302, to generate a composite image in which the virtual objects 308 and 310 appear in the physical environment with the physical objects 316 and 318, at the desired location and depth relative to the physical objects 316 and 318.

In various operational scenarios, one or more portions of one or more of the virtual objects 308 and 310 may overlap one or more portions of one or more of the physical objects 316 and 318, and/or one or more portions of one or more of the physical objects 316 and 318 may overlap one or more portions of one or more of the virtual objects 308 and 310.

Figure 4:
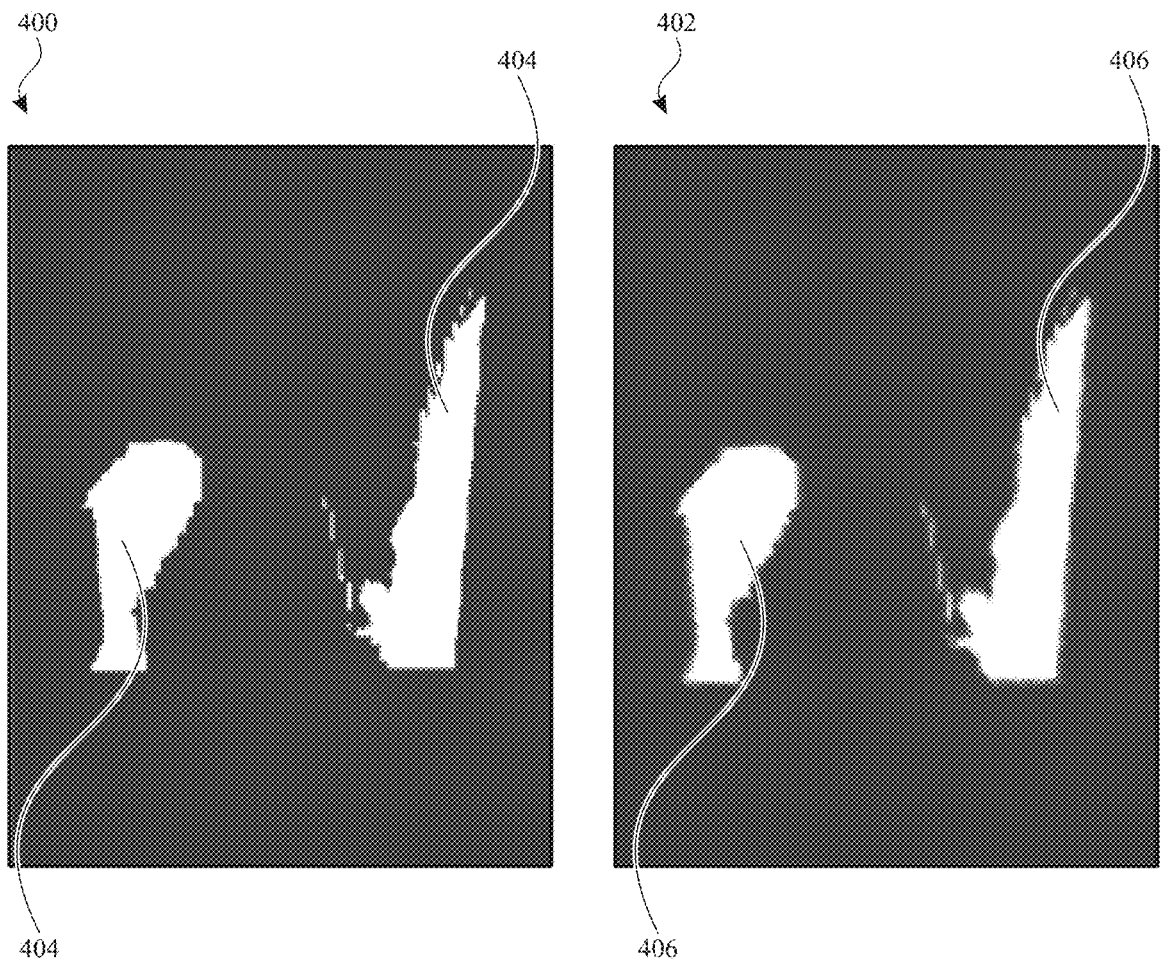
FIG. 4 illustrates examples of an occlusion mask and an alpha mask, in accordance with one or more implementations.

As a part of the process of combining the image 304 and the virtual content of virtual image 300, an occlusion mask may be generated that indicates pixels in the image 304 and pixels in the virtual image 300 (e.g., and/or other indications of virtual content at various locations) at which the physical or virtual objects are occluded by others of the virtual or physical objects. FIG. 4 illustrates an example of an occlusion mask 400 that may be generated for the image 304 and the virtual image 300, using the corresponding physical depth information in the physical depth image 306 and the corresponding virtual depth information in the virtual depth image 302.

In the example of FIG. 4, the occlusion mask 400 includes occlusion mask pixel values 404 that indicate pixel locations in the image 304 and the virtual image 300 at which physical objects 316 and 318 are foreground (e.g., closer to the viewer) to the virtual objects 308 and 310. For example, the occlusion mask pixel values of the occlusion mask 400 may be binary pixel values (e.g., having a first value such as one to indicate that a physical object is foreground to a virtual object or a second value such as zero to indicate that no physical object is foreground to a virtual object).

In one or more implementations, the occlusion mask 400 can be used to generate a composite image. For example, where the occlusion mask pixel values of the occlusion mask 400 are one and/or where there is no corresponding virtual content at that pixel (e.g., in the virtual image 300), the corresponding pixels of the image 304 can be used as the composite image pixel values, and where the occlusion mask pixel values of the occlusion mask 400 are zero and virtual content such as a virtual object exists (e.g., is rendered) at that pixel, the corresponding pixels of the virtual image 300 can be used as the composite image pixels. However, applying the occlusion mask 400 in this way can generate visible transitions at the boundaries of the occluded regions (e.g., due in part to a resolution mismatch between the virtual or physical environment information and/or images and/or virtual or physical depth information and/or images) that appear unnatural and/or distracting to a user.

In order to more smoothly combine the image 304 and the virtual image 300, an electronic device such as electronic device 105 may generate an alpha mask 402 based on the occlusion mask 400. In contrast with the binary values of the occlusion mask pixels of the occlusion mask 400, the alpha mask 402 may have alpha mask pixel values 406 in a range such as the range $[0, \ldots, 1]$, or a representation thereof (e.g. $[0, \ldots, 255]$). The alpha mask 402 may be generated, for example, by applying a guided filter having the occlusion mask 400 and the image 304 as input in order to generate alpha mask pixel values 406. In this example, the alpha mask pixel values 406 may be computed from the dot product between multiple coefficients (e.g., a coefficient for each color of the physical environment image and/or the virtual image, and a bias coefficient) and the color pixel values of the image 304. The color pixel values of the virtual image 300 and the image 304 can be combined using the values of alpha mask pixels to provide a blend of the color of the virtual information and the color of the physical information for pixels at or near the interface between overlapping virtual and physical objects in the composite image.

Figure 5:
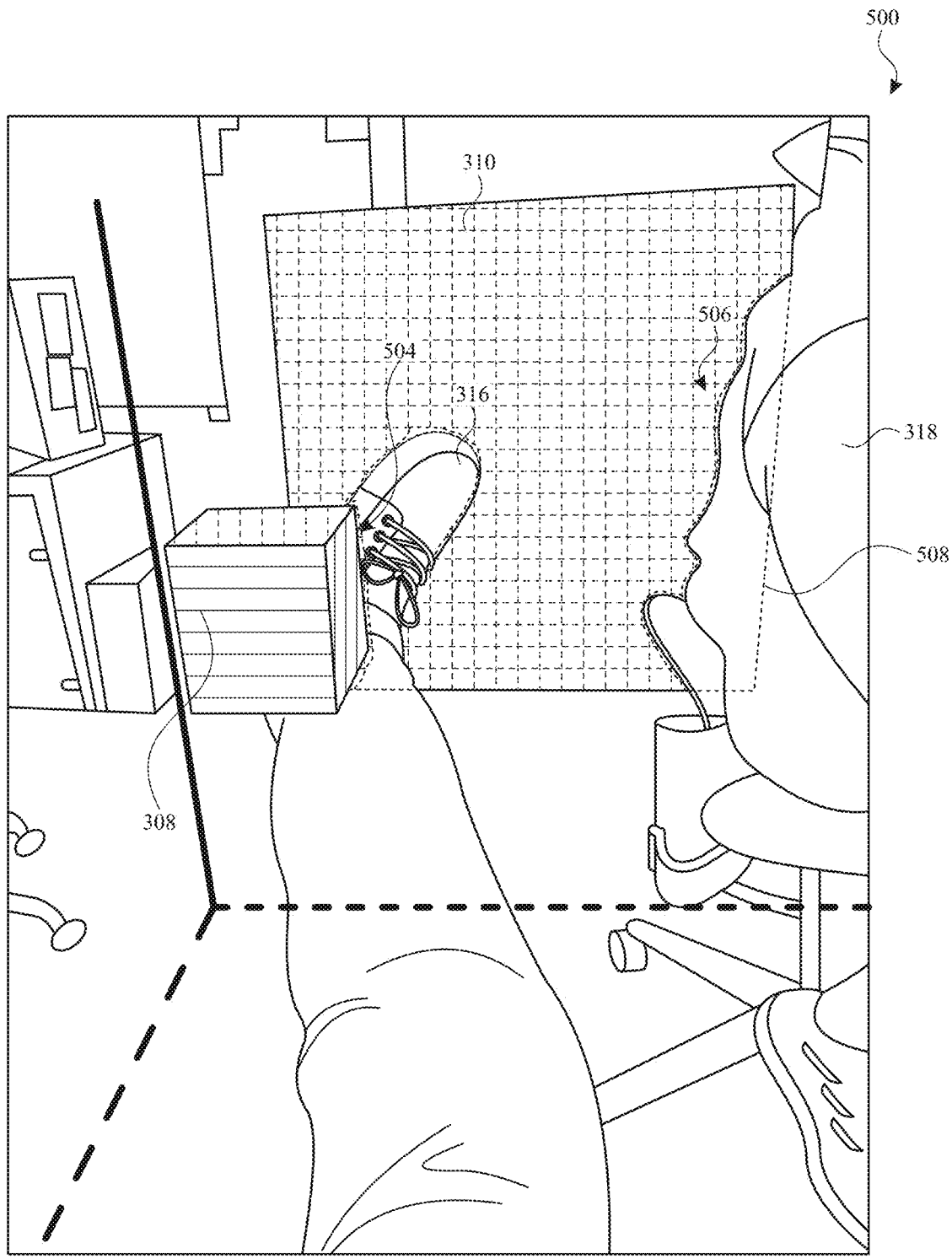
FIG. 5 illustrates an example of a composite image having artifacts, in accordance with one or more implementations.

FIG. 5 illustrates a composite image 500 generated by combining image 304 and the virtual content of the virtual image 300 of FIG. 3 using the alpha mask pixel values 406 of the alpha mask 402 of FIG. 4. As shown in FIG. 5, the virtual object 308 partially occludes the physical object 316 (e.g., the user's foot), which itself partially occludes the virtual object 310. The physical object 318 can also be seen partially occluding the virtual object 310.

In the example of FIG. 5, the composite image 500 includes (i) boundaries 506 at locations at which a physical object (e.g., physical object 318 corresponding to the back of a person in a chair) is in front of a background virtual object (e.g., virtual object 310) and ends (e.g., at the edge of the person's back) and thus no longer occludes the background virtual object, (ii) boundaries 508 at locations at which a background virtual object (e.g., virtual object 310) is still being occluded by a physical object (e.g., physical object 318) and ends behind the physical object (e.g., at the edge of the virtual object 310 that is located behind the person's back and thus not visible in the composite image), and (iii) boundaries 504 at locations at which a virtual object (e.g., virtual object 308) is located in front of a physical object (e.g., physical object 316 corresponding to the user's foot) that occludes another virtual object (e.g., virtual object 310) and occludes the real object that is occluding the other virtual object.

Turning back to FIG. 4, it can be seen that each of the boundaries 504, 506, and 508 correspond to an edge in the occlusion mask 400 (e.g., an edge at boundary between an occluded pixel value, such as one, and an unoccluded pixel value, such as zero). Composite images generated using an alpha mask such as alpha mask 402 to combine a virtual image and a physical environment image may generate artifacts in a composite image. Artifacts in a composite image generated using an alpha mask as described may occur particularly at locations where an edge in the occlusion mask 400 corresponds to an edge of a virtual object. In the example of FIG. 5, examples of such artifacts can be seen at the boundaries 504 and 508.

Implementations of the subject technology provide for the identification and correction and/or adjustment of artifacts in composite images, such as the artifacts shown in the example of FIG. 5.

Figure 6:
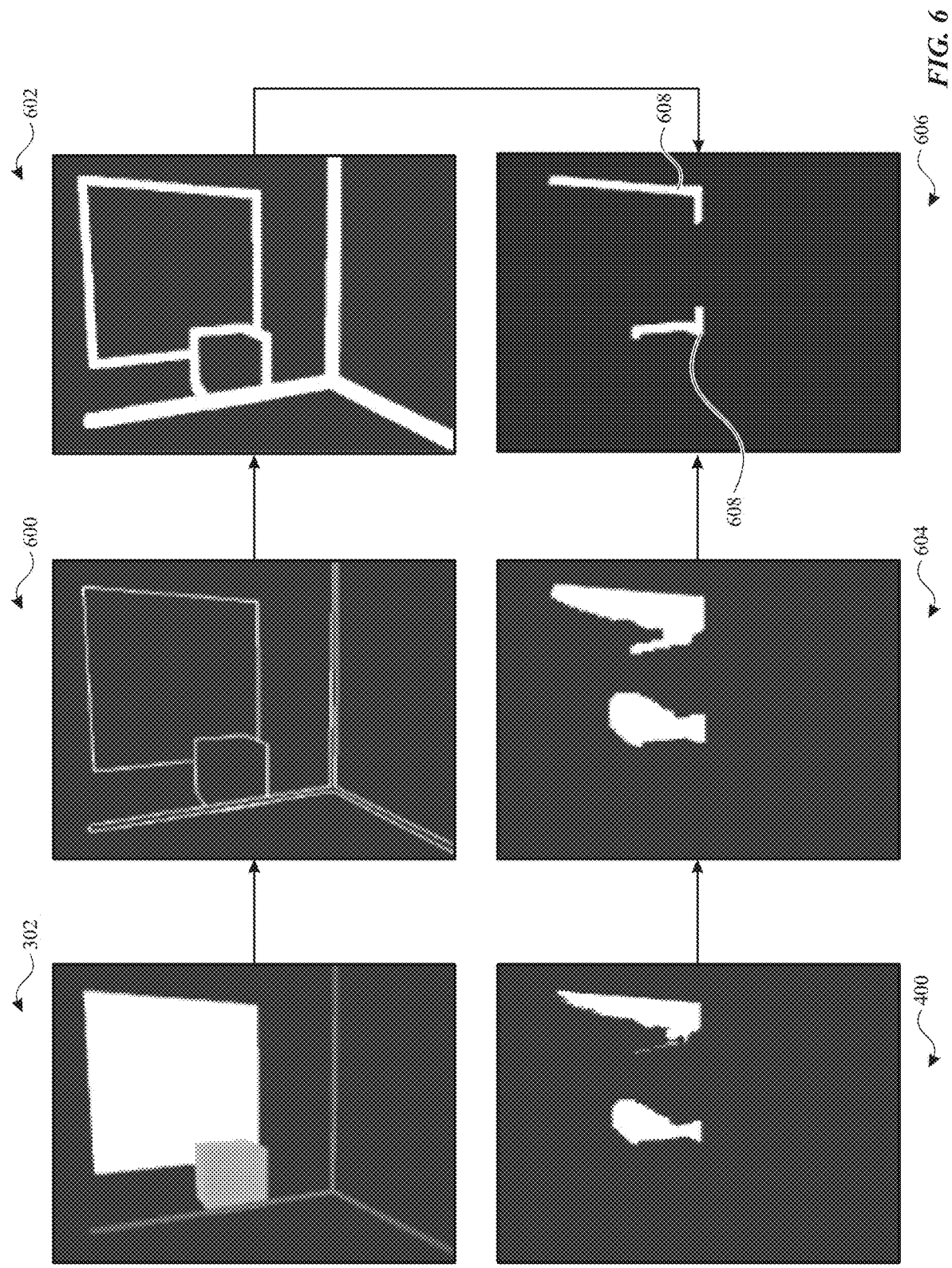
FIG. 6 illustrates a schematic flow diagram for generation of an adjustment mask, in accordance with one or more implementations.

For example, as illustrated in FIG. 6, an edge mask 600 may be generated based on the virtual content, such as virtual depth image 302 (or the virtual image 300) and/or the virtual object(s) 308 and/or 310. For example, the edge mask 600 may be generated by running an edge filter on the virtual depth image 302, such as by setting edge pixels in the edge mask 600 to a first value (e.g., one) when the edge filter response of the virtual depth image 302 is greater than a threshold and to a second value (e.g., zero) when the edge filter response of the virtual depth image 302 is less than a threshold. In this way, the edges of the virtual objects in the virtual image 300 can be identified. The threshold can be adjusted to keep only the strongest edges of the virtual objects and avoid identifying noise in the virtual depth image as edges.

In one or more implementations, a dilated edge mask 602 may also be generated (e.g., by increasing the width of the detected edges, such as by setting the edge values of a predetermined number of edge pixels that are adjacent to an edge pixel have the first value, to the first value). In one or more implementations, a dilated occlusion mask 604 may also be generated based on the occlusion mask 400 (e.g., by dilating the occlusion mask 400). Dilating the occlusion mask may include expanding the edges in the occlusion mask 400 (e.g., by setting the occlusion mask pixel values of a predetermined number of occlusion mask pixels that are adjacent to an occlusion mask pixel having a first value, to the first value).

As shown in FIG. 6, an adjustment mask 606 can be generated based on the edge mask 600 and the occlusion mask 400 (e.g., based on the dilated edge mask 602 and the dilated occlusion mask 604). For example, the adjustment mask 606 may be a logical AND of the dilated edge mask 602 and the dilated occlusion mask 604.

For example, the adjustment mask 606 may include adjustment pixel values 608 (e.g., having a first value such as one) that indicate a correction and/or adjustment is to be applied to the corresponding composite image pixels in the composite image 500. The adjustment mask 606 may include adjustment pixel values having a second value, such as zero, where no correction/adjustment is to be applied. Looking back to FIGS. 4 and 5, the pixels identified for adjustment in the adjustment mask 606 correspond to the boundaries 504 and 508 in composite image 500, which correspond to edges in the occlusion mask 400 that occur at an edge of a virtual object. Accordingly, the adjustment mask 606 identifies (e.g., flags) locations (e.g., pixels) in the composite image 500 at which the alpha mask 402 may produce artifacts.

A composite image generated by combining an image 304 of the physical environment with virtual content and/or objects such as in a virtual image 300 can then be corrected or adjusted to remove artifacts by modifying the pixels of the composite image that are flagged by the adjustment mask 606 (e.g., the pixels of the composite image corresponding to the adjustment pixel values 608).

In one or more implementations, correcting the composite image 500 based on the adjustment mask may include overriding the alpha mask for the pixels of the composite image/alpha mask that correspond to adjustment pixel values 608 of the adjustment mask 606. For example, overriding the alpha mask may include ignoring the alpha mask value and selecting a pixel value directly from the virtual image 300 or the image 304 (e.g., based on the occlusion mask 400) for any composite image pixel corresponding to an adjustment pixel value 608 of the adjustment mask 606.

However, because the combination of the image 304 and the virtual image 300 using the alpha mask 402 may correct for other combination issues such as a differing resolution between the image 304 and the virtual content information such as the virtual image 300 (and/or the image(s) and the depth image(s)), correcting the composite image 500 by overriding the alpha mask may allow other artifacts to appear in the composite image. In one or more implementations, applying the correction to the alpha mask 402 may generate improved artifact reduction. For example, in one or more implementations, correcting the pixel values of the composite image may include modifying the alpha mask 402 based on the adjustment mask 606. Modifying the alpha mask 402 may include modifying the values (e.g., weighting coefficients) of one or more of the alpha mask pixels at locations in the alpha mask 402 that correspond to non-zero pixels (e.g., with adjustment pixel values 608) of the adjustment mask 606.

In implementations in which, for example, a dilated occlusion mask such as dilated occlusion mask 604 is used in the generation of the adjustment mask 606, the adjustment mask 606 may flag pixels for correction or adjustment that span the boundaries between virtual and physical objects. For example, the adjustment pixel values 608 of the adjustment mask 606 may correspond to pixels that are interior to the pixels corresponding to occlusion mask pixel values 404 of the occlusion mask 400 (e.g., corresponding to pixels in which a physical object from the physical environment image is in the foreground), and pixels that are exterior to the pixels corresponding to occlusion mask pixel values 404 of the occlusion mask 400 (e.g., corresponding to pixels in which a virtual object from the virtual image is in the foreground).

In one or more implementations, a system process or an application for generating XR environments may be primarily concerned with correcting portions of the image of the physical environment, primarily concerned with correcting portions of virtual objects and/or the virtual image, and/or correcting the portions of the physical environment image and virtual image in separate (e.g., parallel) processes. Correcting the images in these ways may save power and/or processing resources, in one or more implementations. In order to facilitate correcting only portions of the physical environment image, correcting only portions of the virtual image, and/or correcting the portions of the physical environment image and virtual image in separate (e.g., parallel) processes, an electronic device such as electronic device 105 may split the adjustment mask to form an interior adjustment mask and an exterior adjustment mask.

Figure 7:
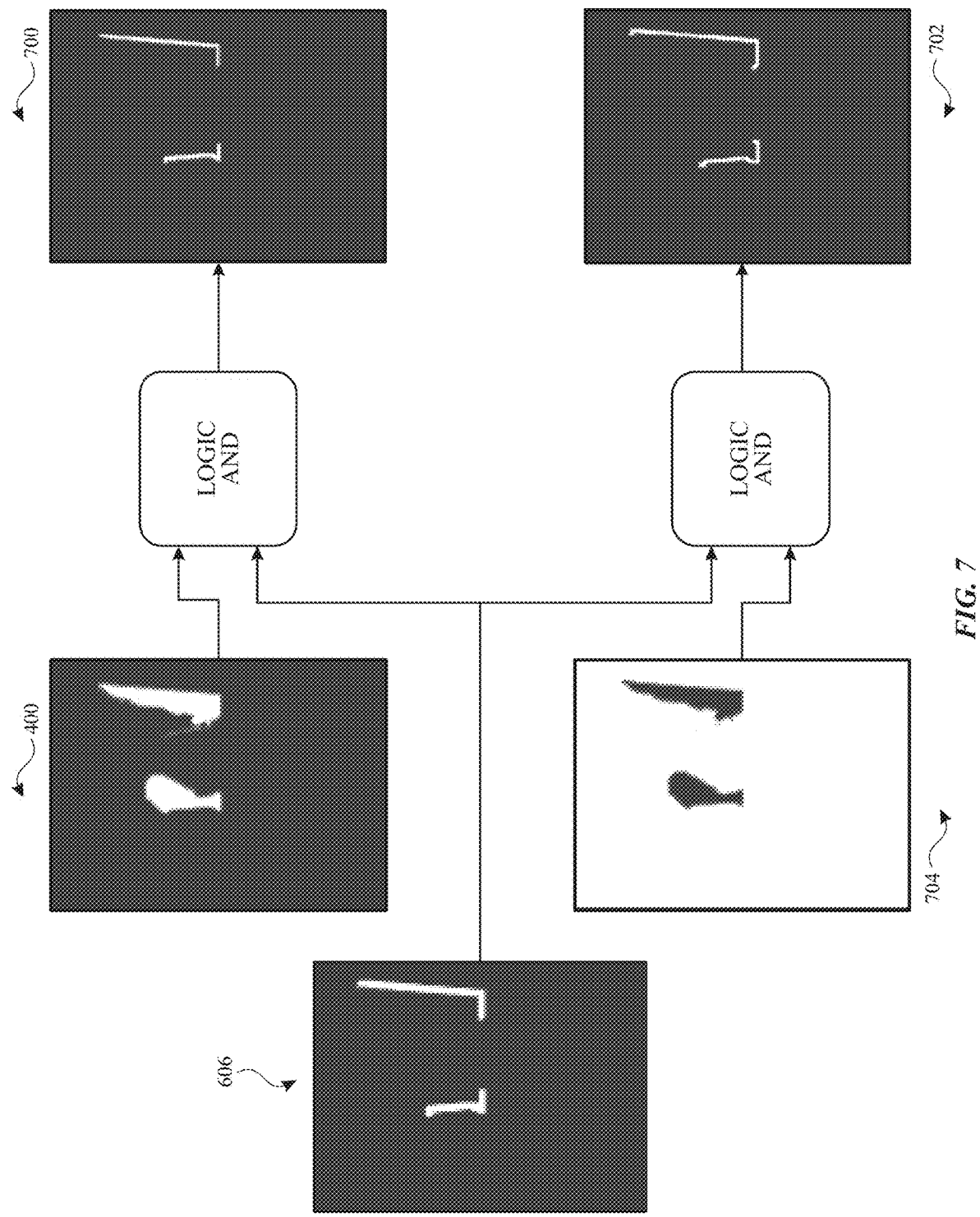
FIG. 7 illustrates a schematic flow diagram for splitting an adjustment mask to form an interior adjustment mask and an exterior adjustment mask, in accordance with one or more implementations.

FIG. 7 illustrates a process for splitting the adjustment mask to form an interior adjustment mask and an exterior adjustment mask, in accordance with one or more implementations. As shown in FIG. 7, the adjustment mask 606 can be split to form an interior adjustment mask 700 and an exterior adjustment mask 702 by (i) combining (e.g., using a logical AND) the adjustment mask 606 and the occlusion mask 400 to form the interior adjustment mask 700, and (ii)

combining (e.g., using a logical AND) the adjustment mask 606 and an inverse 704 (e.g., a logical negation) of the occlusion mask 400 to form the exterior adjustment mask 702.

An electronic device may correct only portions of the physical environment image by applying a correction (e.g., to the alpha mask) for pixels flagged in the interior adjustment mask 700. An electronic device may correct only portions of the virtual image by applying a correction (e.g., to the alpha mask) for pixels flagged in the exterior adjustment mask 702. An electronic device may correct the portions of the physical environment image and the virtual content or image in separate (e.g., parallel) processes by, for example, providing the interior adjustment mask 700 to a process for correcting the physical environment image and providing the exterior adjustment mask 702 to a separate process for correcting the virtual content or image.

Figure 8:
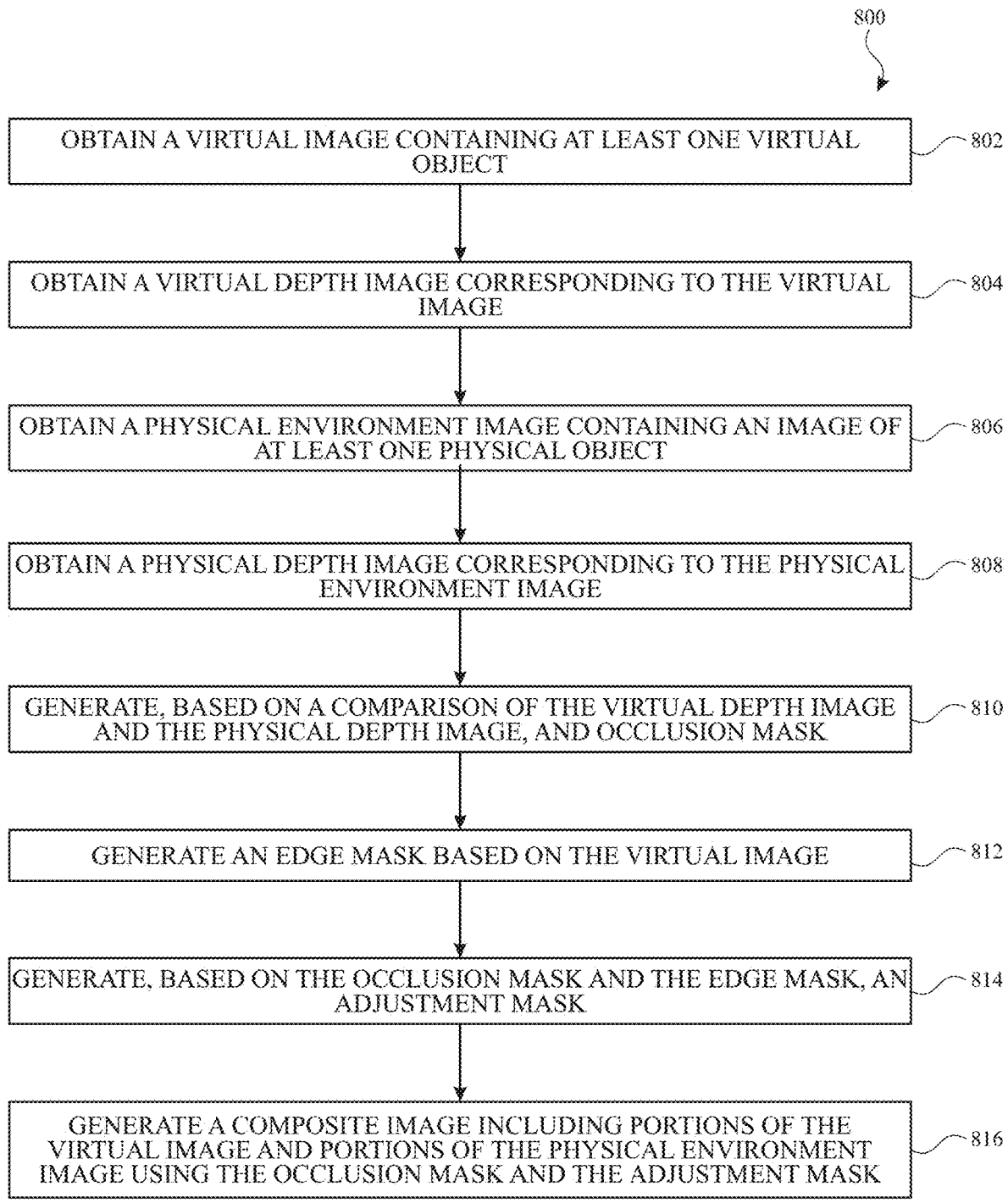
FIG. 8 illustrates a flow chart of an example process for image composition for extended reality systems in accordance with implementations of the subject technology.

FIG. 8 illustrates a flow diagram of an example process 800 for image composition for extended reality systems, in accordance with implementations of the subject technology. For explanatory purposes, the process 800 is primarily described herein with reference to the electronic device 105 of FIGS. 1 and 2. However, the process 800 is not limited to the electronic device 105 of FIGS. 1 and 2, and one or more blocks (or operations) of the process 800 may be performed by one or more other components of other suitable devices, including the electronic device 110, the electronic device 115, and/or the servers 120. Further for explanatory purposes, some of the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

As illustrated in FIG. 8, at block 802, an electronic device such as electronic device 105 may obtain a virtual image, such as virtual image 300, containing at least one virtual object, such as virtual object 308 or virtual object 310.

At block 804, the electronic device may obtain a virtual depth image, such as virtual depth image 302, corresponding to the virtual image. In one or more implementations, the virtual image and/or the virtual depth image may be generated by an application such as an XR application at the electronic device.

At block 806, the electronic device may obtain an image, such as image 304, containing an image of at least one physical object, such as physical object 316 or physical object 318. Obtaining the image may include capturing the image using a camera of the electronic device.

At block 808, the electronic device may obtain a physical depth image, such as physical depth image 306, corresponding to the image. Obtaining the physical depth image may include generating the physical depth image using a depth sensor and/or one or more cameras of the electronic device (e.g., by obtaining the physical depth information as an output from a neural network that receives, as input, one or more camera images and position and/or motion information such as IMU information).

At block 810, the electronic device may generate, based on a comparison of the virtual depth image and the physical depth image, an occlusion mask, such as occlusion mask 400. In one or more implementations, the occlusion mask indicates pixel locations (e.g., pixels corresponding to occlusion mask pixel values 404) at which the physical object is foreground to the virtual object, or vice versa.

At block 812, the electronic device may generate an edge mask, such as edge mask 600, based on the virtual image and/or the virtual depth image (e.g., as described above in connection with FIG. 6). In one or more implementations, the edge mask indicates pixel locations at one or more edges of the virtual object in the virtual image.

At block 814, the electronic device may generate, based on the occlusion mask and the edge mask, an adjustment mask, such as adjustment mask 606. In one or more implementations, the electronic device may dilate the edge mask prior to generating the adjustment mask, and generate the adjustment mask based on the occlusion mask and the dilated edge mask (e.g., dilated edge mask 602). In one or more implementations, the electronic device may dilate the occlusion mask prior to generating the adjustment mask, and generate the adjustment mask based on the dilated occlusion mask (e.g., dilated occlusion mask 604) and the dilated edge mask.

At block 816, the electronic device may generate a composite image including portions of the virtual image and portions of the image using the occlusion mask and the adjustment mask. In one or more implementations, generating the composite image including portions of the virtual image and portions of the image using the occlusion mask and the adjustment mask may include generating an alpha mask, such as alpha mask 402, based on the occlusion mask, and modifying one or more parameters (e.g., coefficients) of the alpha mask based on the adjustment mask. Generating the composite image may also include forming pixel values of the composite image from one or more of corresponding pixel values of the virtual image and corresponding pixel values of the image, as determined based on corresponding parameters for corresponding pixels of the alpha mask.

In one or more implementations, the electronic device may also split the adjustment mask to form an interior adjustment mask, such as interior adjustment mask 700, and an exterior adjustment mask, such as exterior adjustment mask 702.

In one or more implementations, generating the composite image using the occlusion mask and the adjustment mask may include generating the composite image using the occlusion mask and either the interior adjustment mask or the exterior adjustment mask. In one or more implementations, generating the composite image using the occlusion mask and the adjustment mask may include generating the composite image using the occlusion mask and both the interior adjustment mask and the exterior adjustment mask. Generating the composite image using the occlusion mask and both the interior adjustment mask and the exterior adjustment mask may include performing a correction associated with the image using the interior adjustment mask, and performing a correction associated with the virtual image using the exterior adjustment mask.

In one or more implementations, splitting the adjustment mask may include generating the interior adjustment mask based on the occlusion mask and the adjustment mask, generating an inverse (e.g., a logical negation) of the occlusion mask, and generating the exterior adjustment mask based on the inverse of the occlusion mask and the adjustment mask (e.g., as described herein in connection with FIG. 7).

Figure 9:
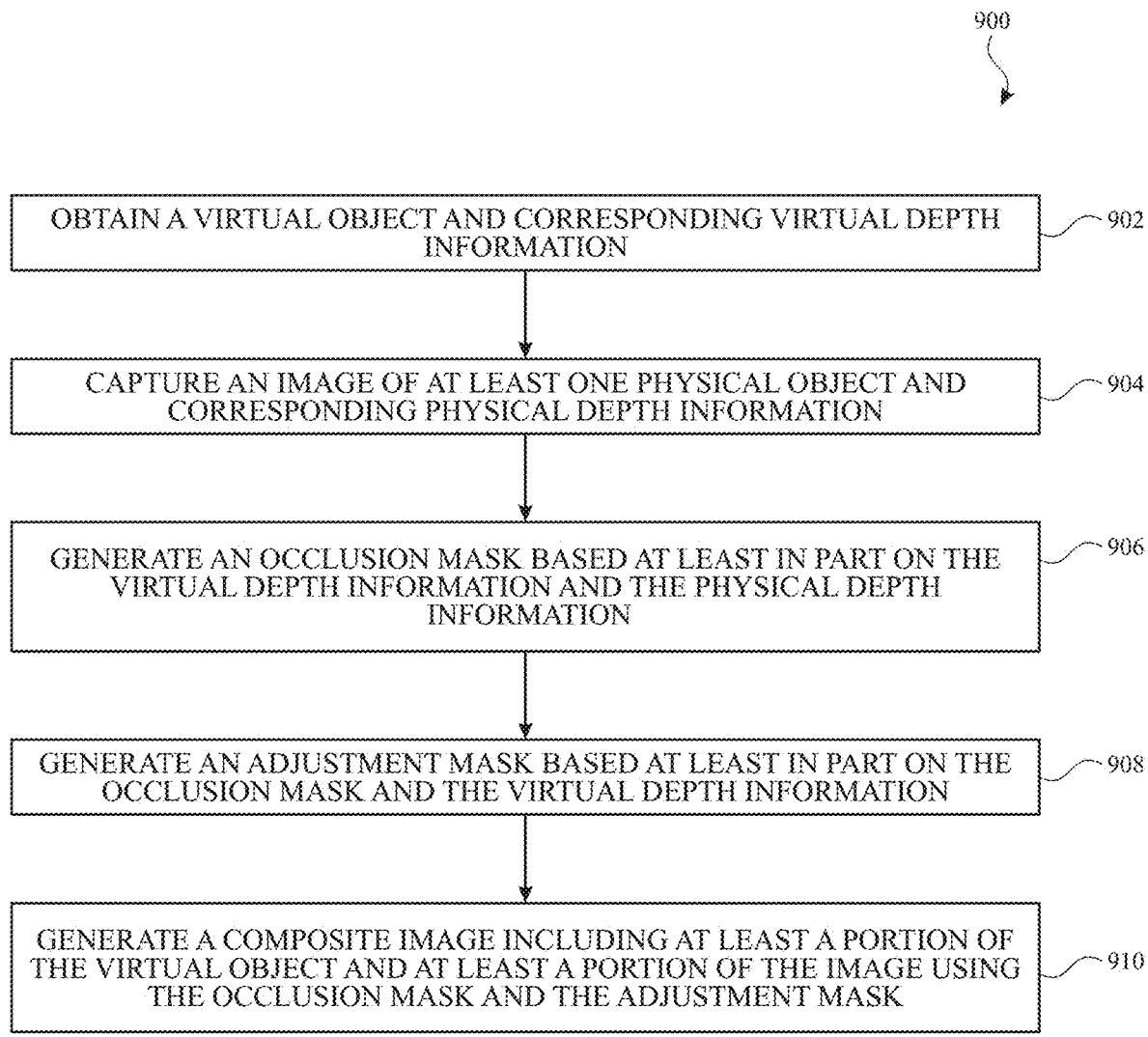
FIG. 9 illustrates a flow chart of another example process for image composition for extended reality systems in accordance with implementations of the subject technology.

FIG. 9 illustrates a flow diagram of another example process 900 for image composition for extended reality systems, in accordance with implementations of the subject technology. For explanatory purposes, the process 900 is primarily described herein with reference to the electronic device 105 of FIGS. 1 and 2. However, the process 900 is not limited to the electronic device 105 of FIGS. 1 and 2, and one or more blocks (or operations) of the process 900 may be performed by one or more other components of other suitable devices, including the electronic device 110, the electronic device 115, and/or the servers 120. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

As illustrated in FIG. 9, at block 902, a virtual object and corresponding virtual depth information may be obtained (e.g., by an electronic device such as electronic device 105). Obtaining the virtual object may include generating the virtual object and the corresponding virtual depth information (e.g., by an application running on the electronic device).

At block 904, an image of at least one physical object (e.g., physical object 316 and/or physical object 318) and corresponding physical depth information (e.g., physical depth information for the physical object 316 and/or the physical object 318, such as the physical depth information indicated by depth pixels 320 and 322) may be captured (e.g., by the electronic device). The image of the physical object and the corresponding physical depth information can be captured using one or more cameras such as cameras 150 and/or one or more sensors such as sensors 152.

At block 906, an occlusion mask (e.g., occlusion mask 400) may be generated (e.g., by the electronic device) based at least in part on the virtual depth information and the physical depth information. In one or more implementations, the occlusion mask indicates pixel locations at which the physical object is foreground to the virtual object.

At block 908, an adjustment mask (e.g., adjustment mask 606) may be generated (e.g., by the electronic device) based at least in part on the occlusion mask and the virtual depth information.

At block 910, a composite image may be generated including at least a portion of the virtual object and at least a portion of the image using the occlusion mask and the adjustment mask.

In one or more implementations, the electronic device may also generate an edge mask (e.g., edge mask 600) based on the virtual depth information. The edge mask may indicate, for example, locations at one or more edges of the virtual object. In one or more implementations, the electronic device may also dilate the edge mask prior to generating the adjustment mask, and generate the adjustment mask based on the occlusion mask and the dilated edge mask. Generating the adjustment mask based on the occlusion mask and the dilated edge mask may include dilating the occlusion mask prior to generating the adjustment mask, and generating the adjustment mask based on the dilated occlusion mask and the dilated edge mask.

In one or more implementations, generating the composite image including the at least the portion of the virtual object and the at least the portion of the image using the occlusion mask and the adjustment mask at block 910 may include generating an alpha mask (e.g., alpha mask 402) based on the occlusion mask, and modifying one or more parameters of the alpha mask based on the adjustment mask.

In one or more implementations, generating the composite image at block 910 may include forming pixel values of the composite image from one or more corresponding pixel values of a virtual image (e.g., virtual image 300) and corresponding pixel values of the image, as determined based on corresponding parameters for corresponding pixels of the alpha mask.

In one or more implementations, the electronic device may also split the adjustment mask to form an interior adjustment mask (e.g., interior adjustment mask 700) and an exterior adjustment mask (e.g., exterior adjustment mask 702). Generating the composite image at block 910 using the occlusion mask and the adjustment mask may include generating the composite image using the occlusion mask and either the interior adjustment mask or the exterior adjustment mask, or generating the composite image using the occlusion mask and both the interior adjustment mask and the exterior adjustment mask. Generating the composite image using the occlusion mask and both the interior adjustment mask and the exterior adjustment mask may include performing a correction associated with the image using the interior adjustment mask, and performing a correction associated with the virtual object using the exterior adjustment mask.

In one or more implementations, splitting the adjustment mask may include generating the interior adjustment mask based on the occlusion mask and the adjustment mask, generating an inverse of the occlusion mask, and generating the exterior adjustment mask based on the inverse of the occlusion mask and the adjustment mask.

The present disclosure recognizes that the use of such personal information data, in the present technology, can be used to the benefit of users. For example, the personal information data can be used for image composition for extended reality systems.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of image composition for extended reality systems, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 10:
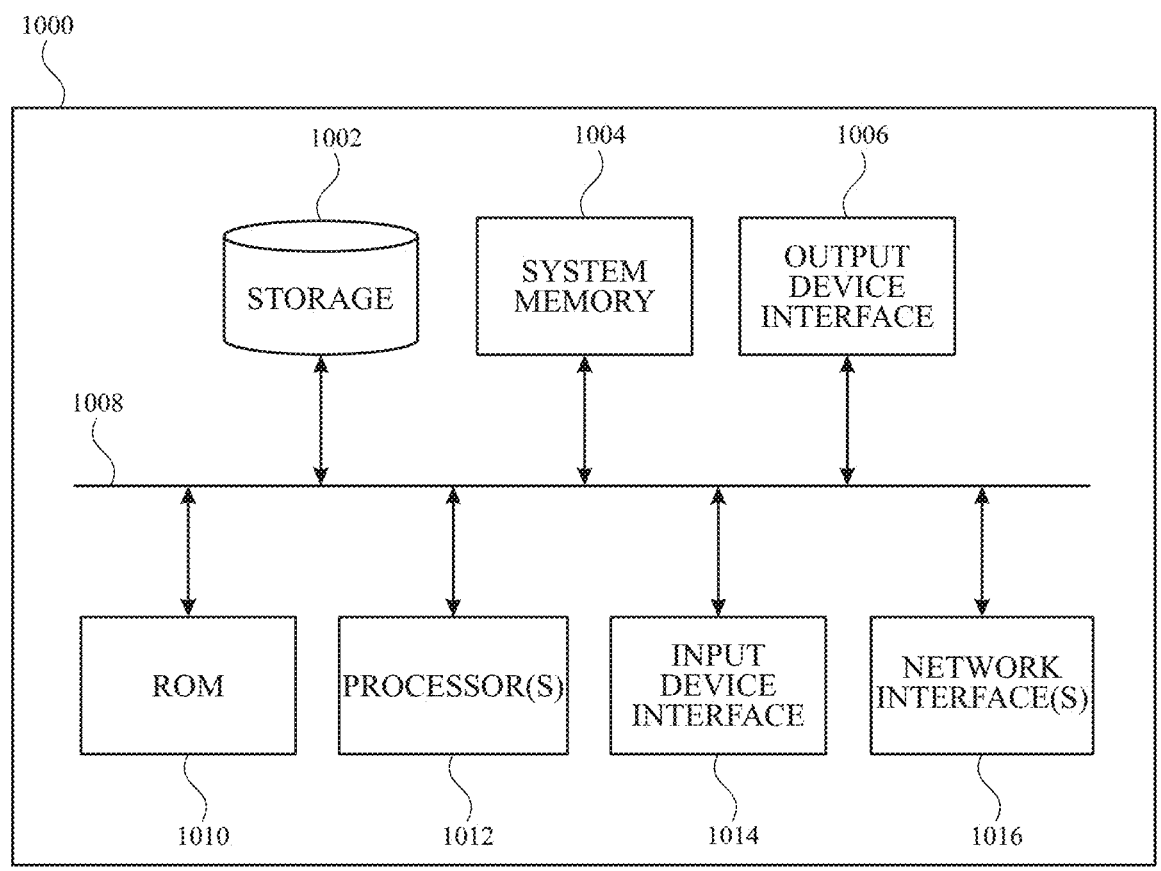
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 105, the handheld electronic device 104, the electronic device 110, the electronic device 115, and/or the server 120 as shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010 (which are each implemented as a non-transitory computer-readable medium). From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 110 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In accordance with aspects of the disclosure, a method is provided that includes obtaining a virtual object and corresponding virtual depth information; capturing an image of at least one physical object and corresponding physical depth information; generating an occlusion mask based at least in part on the virtual depth information and the physical depth information; generating an adjustment mask based at least in part on the occlusion mask and the virtual depth information; and generating a composite image including at least a portion of the virtual object and at least a portion of the image using the occlusion mask and the adjustment mask.

In accordance with aspects of the disclosure, a device is provided that includes a camera; memory; and one or more processors configured to: obtain a virtual object and corresponding virtual depth information; capture, using at least the camera, an image of at least one physical object and corresponding physical depth information; generate an occlusion mask based at least in part on the virtual depth information and the physical depth information; generate an adjustment mask based at least in part on the occlusion mask and the virtual depth information; and generate a composite image including at least a portion of the virtual object and at least a portion of the image using the occlusion mask and the adjustment mask.

In accordance with aspects of the disclosure, a non-transitory computer-readable medium is provided storing instructions which, when executed by one or more processors, cause the one or more processors to perform operations that include: obtaining a virtual object and corresponding virtual depth information; capturing an image of at least one physical object and corresponding physical depth information; generating an occlusion mask based at least in part on the virtual depth information and the physical depth information; generating an adjustment mask based at least in part on the occlusion mask and the virtual depth information; and generating a composite image including at least a portion of the virtual object and at least a portion of the image using the occlusion mask and the adjustment mask.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    obtaining a virtual object and corresponding virtual depth information;
    capturing an image of at least one physical object and corresponding physical depth information;
    generating an occlusion mask based at least in part on the virtual depth information and the physical depth information;
    generating an adjustment mask based at least in part on the occlusion mask and the virtual depth information; and
    generating a composite image including at least a portion of the virtual object and at least a portion of the image using the occlusion mask and the adjustment mask.

2. The method of claim 1, wherein the occlusion mask indicates pixel locations at which the physical object is foreground to the virtual object.

3. The method of claim 2, further comprising generating an edge mask based on the virtual depth information, wherein the edge mask indicates locations at one or more edges of the virtual object.

4. The method of claim 3, further comprising:
    dilating the edge mask prior to generating the adjustment mask; and
    generating the adjustment mask based on the occlusion mask and the dilated edge mask.

5. The method of claim 4, wherein generating the adjustment mask based on the occlusion mask and the dilated edge mask comprises:
    dilating the occlusion mask prior to generating the adjustment mask; and
    generating the adjustment mask based on the dilated occlusion mask and the dilated edge mask.

6. The method of claim 1, wherein generating the composite image including the at least the portion of the virtual object and the at least the portion of the image using the occlusion mask and the adjustment mask comprises:
    generating an alpha mask based on the occlusion mask; and
    modifying one or more parameters of the alpha mask based on the adjustment mask.

7. The method of claim 6, wherein generating the composite image further comprises:
    forming pixel values of the composite image from one or more of corresponding pixel values of a virtual image and corresponding pixel values of the image, as determined based on corresponding parameters for corresponding pixels of the alpha mask.

8. The method of claim 1, further comprising:
    splitting the adjustment mask to form an interior adjustment mask and an exterior adjustment mask,
    wherein generating the composite image using the occlusion mask and the adjustment mask comprises generating the composite image using the occlusion mask and either the interior adjustment mask or the exterior adjustment mask.

9. The method of claim 8, wherein splitting the adjustment mask comprises:
    generating the interior adjustment mask based on the occlusion mask and the adjustment mask;
    generating an inverse of the occlusion mask; and
    generating the exterior adjustment mask based on the inverse of the occlusion mask and the adjustment mask.

10. The method of claim 1, further comprising:
    splitting the adjustment mask to form an interior adjustment mask and an exterior adjustment mask,
    wherein generating the composite image using the occlusion mask and the adjustment mask comprises generating the composite image using the occlusion mask and both the interior adjustment mask and the exterior adjustment mask.

11. The method of claim 10, wherein generating the composite image using the occlusion mask and both the interior adjustment mask and the exterior adjustment mask comprises:
    performing a correction associated with the image using the interior adjustment mask; and
    performing a correction associated with the virtual object using the exterior adjustment mask.

12. A device, comprising:
    a camera;
    memory; and
    one or more processors configured to:
    obtain a virtual object and corresponding virtual depth information;
    capture, using at least the camera, an image of at least one physical object and corresponding physical depth information;
    generate an occlusion mask based at least in part on the virtual depth information and the physical depth information;
    generate an adjustment mask based at least in part on the occlusion mask and the virtual depth information; and
    generate a composite image including at least a portion of the virtual object and at least a portion of the image using the occlusion mask and the adjustment mask.

13. The device of claim 12, further comprising a depth sensor configured to obtain the physical depth information, and a display configured to display the composite image.

14. The device of claim 12, wherein the one or more processors are configured to generate the composite image including the at least the portion of the virtual object and the at least the portion of the image using the occlusion mask and the adjustment mask by:
    generating an alpha mask based on the occlusion mask; and
    modifying one or more parameters of the alpha mask based on the adjustment mask.

15. The device of claim 14, wherein the one or more processors are further configured to generate the composite image by forming pixel values of the composite image from one or more of corresponding pixel values of a virtual image and corresponding pixel values of the image, as determined based on corresponding parameters for corresponding pixels of the alpha mask.

16. The device of claim 12, wherein the one or more processors are further configured to:
   generate an edge mask based on the virtual depth information;
   dilate the edge mask prior to generating the adjustment mask; and
   generate the adjustment mask based on the occlusion mask and the dilated edge mask.

17. The device of claim 16, wherein the one or more processors are configured to generate the adjustment mask based on the occlusion mask and the dilated edge mask by:
   dilating the occlusion mask prior to generating the adjustment mask; and
   generating the adjustment mask based on the dilated occlusion mask and the dilated edge mask.

18. A non-transitory computer-readable medium storing instructions which, when executed by one or more processors, cause the one or more processors to perform operations comprising:
   obtaining a virtual object and corresponding virtual depth information;
   capturing an image of at least one physical object and corresponding physical depth information;
   generating an occlusion mask based at least in part on the virtual depth information and the physical depth information;
   generating an adjustment mask based at least in part on the occlusion mask and the virtual depth information; and
   generating a composite image including at least a portion of the virtual object and at least a portion of the image using the occlusion mask and the adjustment mask.

19. The non-transitory computer-readable medium of claim 18, wherein the operations further comprise:
   generating an edge mask based on the virtual depth information;
   dilating the edge mask prior to generating the adjustment mask; and
   generating the adjustment mask based on the occlusion mask and the dilated edge mask.

20. The non-transitory computer-readable medium of claim 19, wherein generating the adjustment mask based on the occlusion mask and the dilated edge mask includes:
   dilating the occlusion mask prior to generating the adjustment mask; and
   generating the adjustment mask based on the dilated occlusion mask and the dilated edge mask.

21. The non-transitory computer-readable medium of claim 18, wherein generating the composite image including the at least the portion of the virtual object and the at least the portion of the image using the occlusion mask and the adjustment mask comprises:
   generating an alpha mask based on the occlusion mask;
   modifying one or more parameters of the alpha mask based on the adjustment mask; and
   forming pixel values of the composite image from one or more of corresponding pixel values of a virtual image and corresponding pixel values of the image, as determined based on corresponding parameters for corresponding pixels of the alpha mask.

22. The non-transitory computer-readable medium of claim 18, wherein the operations further comprise:
   splitting the adjustment mask to form an interior adjustment mask and an exterior adjustment mask, wherein generating the composite image using the occlusion mask and the adjustment mask comprises generating the composite image using the occlusion mask and both the interior adjustment mask and the exterior adjustment mask.

23. The method of claim 1, wherein the adjustment mask identifies locations in the composite image at which a correction is to be applied to correct an artifact generated by using the occlusion mask.

24. The method of claim 23, wherein generating the composite image comprises adjusting one or more portions of the composite image to remove the artifact by modifying pixels of the composite image that are identified by the adjustment mask.

25. The method of claim 6, wherein modifying the one or more parameters of the alpha mask based on the adjustment mask comprises modifying one or more weighting coefficients of one or more pixels of the alpha mask at locations in the alpha mask that correspond to non-zero pixels of the adjustment mask.

26. The method of claim 1, wherein generating the composite image including the at least the portion of the virtual object and the at least the portion of the image using the occlusion mask and the adjustment mask comprises:
   generating an alpha mask based on the occlusion mask, the alpha mask comprising alpha mask values for respective alpha mask pixels, each of the alpha mask pixels corresponding to a pixel of the composite image; and
   generating at least one pixel value for at least one pixel of the composite image by overriding the alpha mask value of the alpha mask pixel that corresponds to the at least one pixel of the composite image.

27. The method of claim 26, wherein overriding the alpha mask value of the alpha mask pixel that corresponds to the at least one pixel of the composite image comprises ignoring the alpha mask value of the alpha mask pixel that corresponds to the at least one pixel of the composite image and selecting a pixel value from the virtual object or a pixel value from the image as the at least one pixel value for the at least one pixel of the composite image.

28. The method of claim 5, wherein generating the adjustment mask based on the dilated occlusion mask and the dilated edge mask comprises computing a logical AND of the dilated edge mask and the dilated occlusion mask.

* * * * *